United States Patent [19]

Middleton

[11] 4,046,628
[45] Sept. 6, 1977

[54] NUCLEAR REACTORS

[75] Inventor: John Ernest Middleton, Knutsford, England

[73] Assignee: Nuclear Power Company (Whetstone) Limited, London, England

[21] Appl. No.: 625,507

[22] Filed: Oct. 24, 1975

[30] Foreign Application Priority Data

Oct. 25, 1974 United Kingdom ............... 46267/74

[51] Int. Cl.² ............................................. G21C 15/00
[52] U.S. Cl. ....................................... 176/38; 176/50; 176/61
[58] Field of Search ....................... 176/50, 51, 52, 61, 176/64, 37, 38

[56] References Cited

U.S. PATENT DOCUMENTS

| 3,253,998 | 5/1966 | Hackney | 176/54 |
| 3,346,459 | 10/1967 | Prince et al. | 176/36 |
| 3,379,614 | 4/1968 | Drummond | 176/43 |
| 3,839,150 | 10/1974 | Porter | 176/51 |

FOREIGN PATENT DOCUMENTS

| 790,698 | 7/1968 | Canada | 176/38 |
| 1,272,296 | 4/1972 | United Kingdom | 176/38 |

OTHER PUBLICATIONS

Nucleonics 9/66 "SGHWR: A Dark Horse Competitor" pp. 60-63.

*Primary Examiner*—Samuel W. Engle
*Assistant Examiner*—Ralph Palo
*Attorney, Agent, or Firm*—Kirschstein, Kirschstein, Ottinger & Frank

[57] ABSTRACT

In a water-cooled pressure-tube reactor in which each fuel-containing pressure tube is included in one of two main coolant circuits each of which comprises a bottom header supplying coolant water to the pressure-tube lower ends, a steam drum to which the pressure-tube upper ends are connected, main circulator means pumping water from the steam drum to the bottom header, further pump means pumping an auxiliary coolant water flow from the steam drum of each coolant circuit directly into the pressure tubes of that circuit in the form of spray cooling in such pressure tubes, with the bottom headers of the two circuits interconnected and main feedwater pumps supplying make-up water to the steam drums to replace generated steam, the invention provides, between the main feedwater pumps and the steam drums, water inlet valves which are controlled by pressure in the coolant circuits and are arranged to close in response to a fall in such pressure, and also provides further connections arranged to supply feedwater directly, in the event of such pressure fall, from the main feedwater pumps to the bottom headers and into the pressure tubes of each coolant circuit as the said spray cooling therein.

7 Claims, 4 Drawing Figures

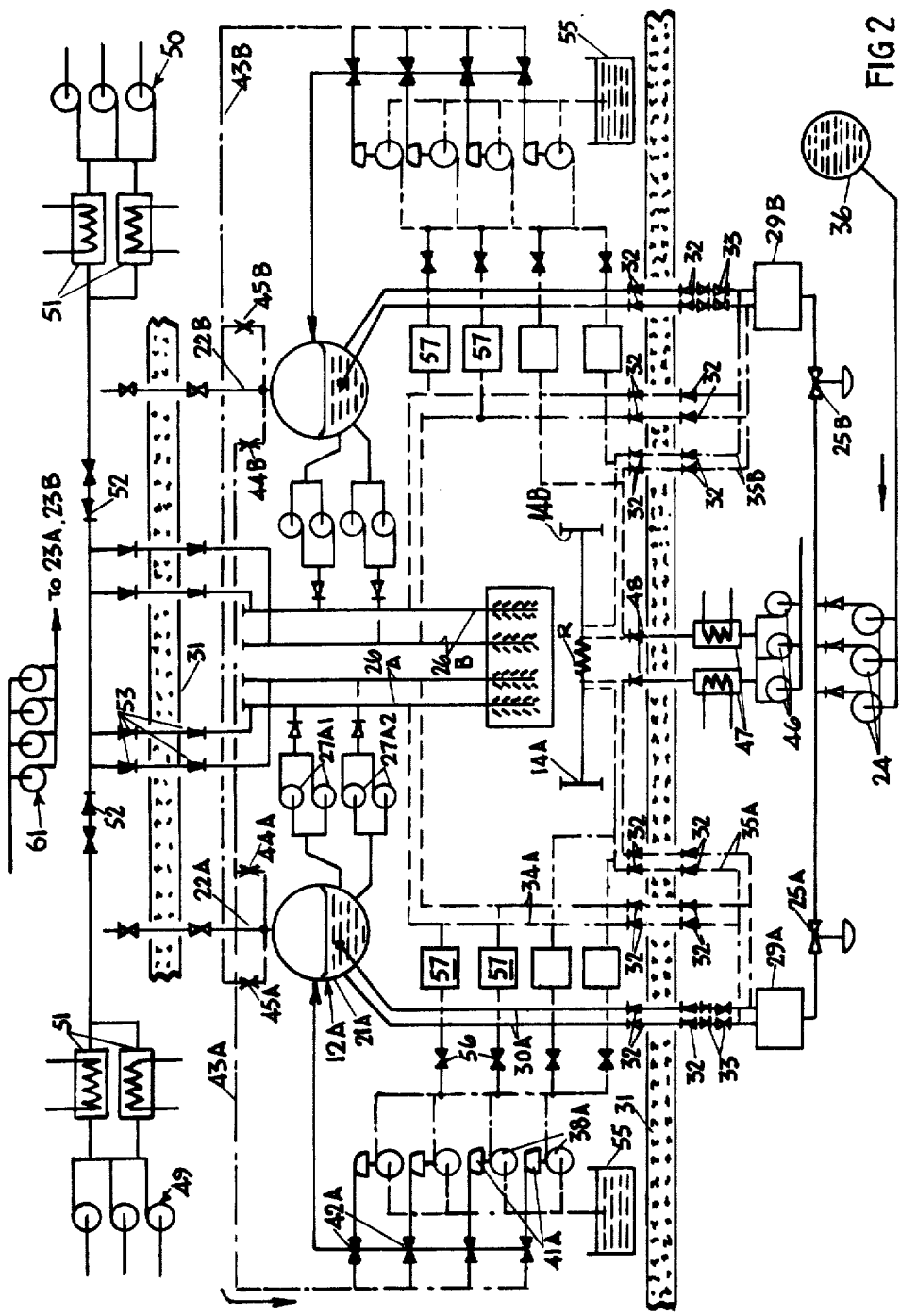

NUCLEAR REACTORS

This invention relates to water-cooled nuclear reactors, and particularly, though not exclusively, to the kind known as the steam generating heavy water reactor (SGHWR), comprising a calandria filled with heavy water which acts as a moderator and formed with calandria tubes which extend vertically through the heavy water, pressure tubes which extend upwardly through the calandria tubes, fuel element assemblies disposed within the pressure tubes, and light water coolant circuits which supply light water to the lower ends of the pressure tubes and which convey away from the upper ends of the pressure tubes, in the form of water and/or steam, the coolant water supplied thereto.

It is known, in such a reactor, to provide that each coolant circuit comprises a steam drum, to which the upper ends of the associated pressure tubes are connected and in which steam produced by heating of the coolant water in those pressure tubes is separated from such of the water as remains unvaporised, a bottom header to which the lower ends of the said associated pressure tubes are connected, and circulator-pump means connected to pump water from the steam drum to the bottom header, the steam drum having a steam outlet connected to supply a steam turbine and a water inlet to which a feedwater pump supplies make-up water (which may in part be recondensed water from the steam turbine exhaust); and it was proposed in my co-pending application Ser. No. 570,667, filed on Apr. 23rd, 1975, to provide four such coolant circuits interconnected in pairs at circulator-pump outlet level (whereby, in the event that normal delivery of coolant water from the circulator-pump means of any one such circuit fails for any reason, a supply of coolant water will be provided, even if at reduced rate, to the pressure tubes which it normally supplies, by the other circuit of the pair), and to arrange that each such circuit supplies to a respective one of the circuits of the other pair an auxiliary coolant water flow which is introduced directly into the pressure tubes of the circuit to which it is supplied, in the form of spray cooling in such pressure tubes (whereby, even if both circuits of one pair should suffer simultaneous failure of the coolant water delivery from their respective circulator-pump means so that neither can supply coolant water to the pressure tubes of the other, those pressure tubes will nevertheless receive at least a residual spray cooling supply from the other pair of circuits).

This last-mentioned proposal, calling for four coolant circuits per reactor, provides a design basis for reactors of outputs up to 1320 MW(e) or more. It would be advantageous to employ coolant circuits of comparable size and rating also in smaller reactor installations, but then less coolant circuits would be required; thus a reactor of 660 MW(e) output would require only two such coolant circuits and, even if these are interconnected at circulator-pump outlet level so that the effects of a failure in one are mitigated by coolant flow from the other, spray cooling, by cross-connection between the two circuits would be ineffective as a secondary emergency provision since, in the event of a major failure in one of the circuits, the other circuit would not be able to provide coolant for spray-cooling of the first circuit in addition to the coolant provided thereto through the interconnection at circulator-pump outlet level.

Nevertheless, it is deemed advantageous, in a reactor of the kind under consideration but having only two parallel-operating coolant circuits, to provide both the above-mentioned interconnection between the circuits at coolant-circulator outlet level and emergency spray-cooling for the pressure tubes of both circuits; and it is an object of the present invention to provide reactor coolant-circuit arrangements which achieve reliability of the spray-cooling provision for both coolant circuits even in the event of a major coolant circulation failure in one or both circuits.

According to the invention, there is provided a water-cooled nuclear reactor comprising two coolant circuits each comprising: a bottom header, a plurality of vertically-arranged pressure tubes each having nuclear fuel disposed therein and being connected at its lower end to the bottom header to receive therefrom a main flow of coolant water for cooling the fuel, a steam drum connected to the upper ends of the pressure tubes to receive heated coolant water therefrom, main coolant-circulator means for pumping water from the steam drum to the bottom header, and respective further pump means arranged to pump an auxiliary coolant water flow from the steam drum of each coolant circuit directly into the pressure tubes of that circuit in the form of spray cooling in such pressure tubes, the bottom headers of the two coolant circuits being interconnected and each steam drum having a steam outlet and water inlet means to which make-up water is supplied by main feedwater pumps, wherein the main feedwater pumps are connected to the said water inlet means via water inlet valves which are controlled in dependence on the pressure in the coolant circuits and which close in response to a fall in such pressure, and wherein the main feedwater pumps are also connected to supply feedwater directly, in the event of such pressure fall, to the bottom header of each coolant circuit and into the pressure tubes as the said spray cooling.

Preferably, where the main feedwater pumps are electrically driven there are also provided emergency feedwater pumps and steam turbines connected to drive the same, said steam turbines being connected to receive steam from the steam drums of both coolant circuits through valves which isolate the steam drums from one another and through normally-closed valves which open in response to a pressure fall in either steam drum.

Preferably, also, the reactor according to the invention is provided additionally with low-pressure feedwater pumps arranged to provide an alternative, low-pressure, spray-cooling water flow to the pressure tubes during the occurrence of low-pressure conditions in the said two coolant circuits; and in that case, advantageously, the low-pressure feed-water pumps are connectable to draw water from the bottom headers of the said two coolant circuits, thereby to provide a circulating flow of low-pressure coolant water through the pressure tubes.

Embodiments of a reactor installation in accordance with the invention are described below with reference to the accompanying drawings, in which:

FIG. 2 is a similar diagram of a second embodiment of the invention, and

Figure 3A:
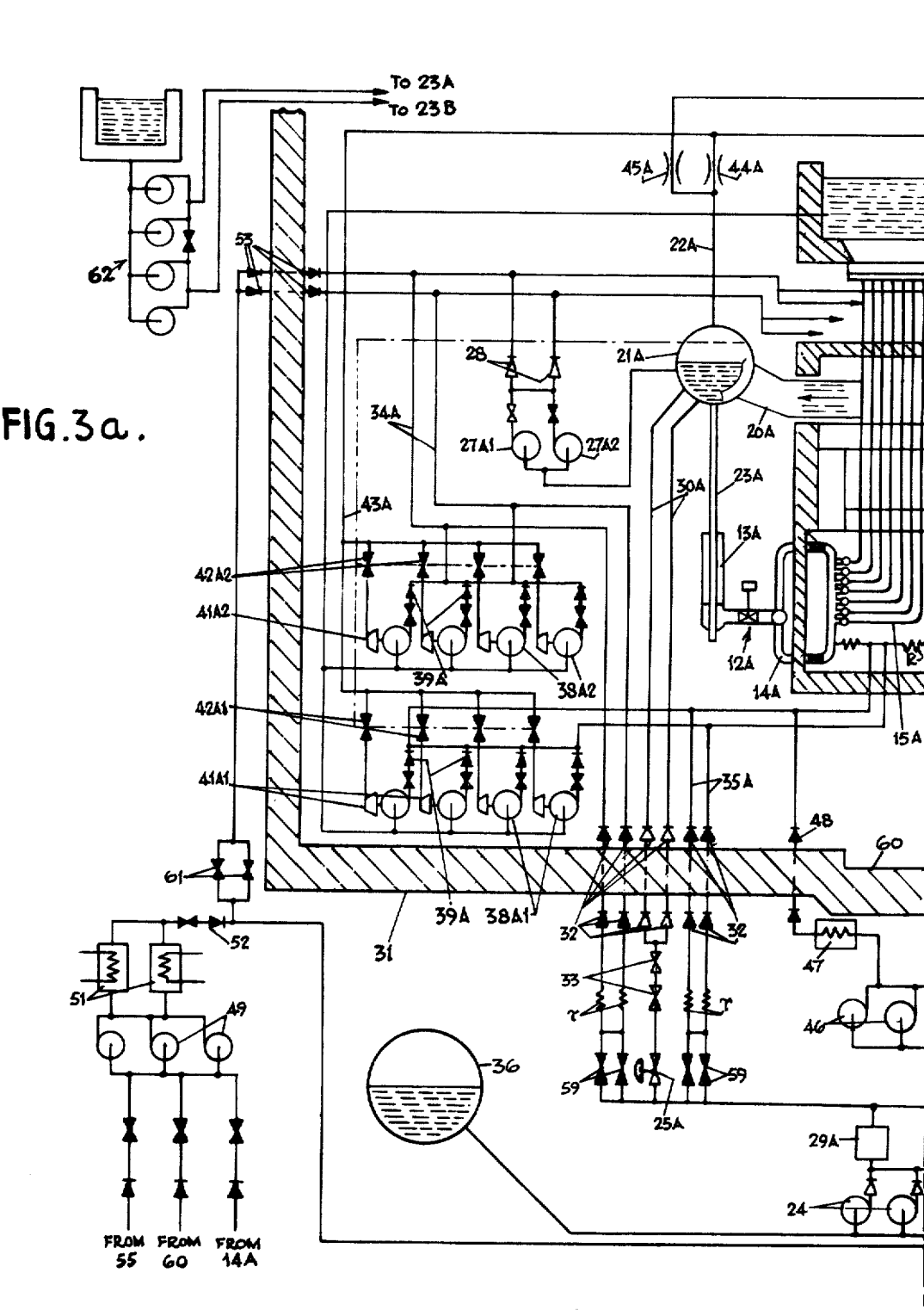
Figure 3B:
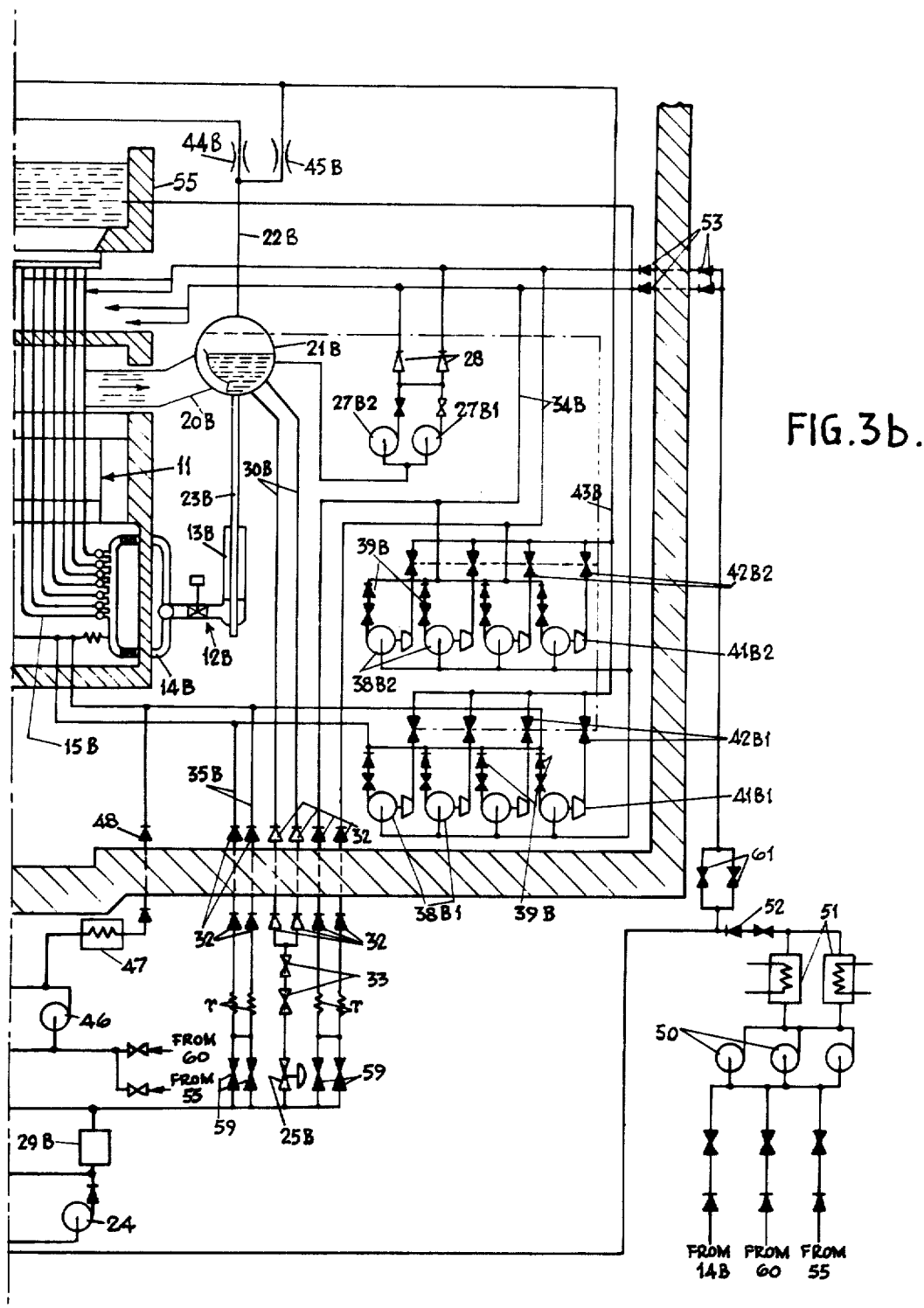

FIG. 3, which is shown in two separate halves (FIGS. 3a and 3b), is a similar diagram of a third embodiment.

Figure 1:
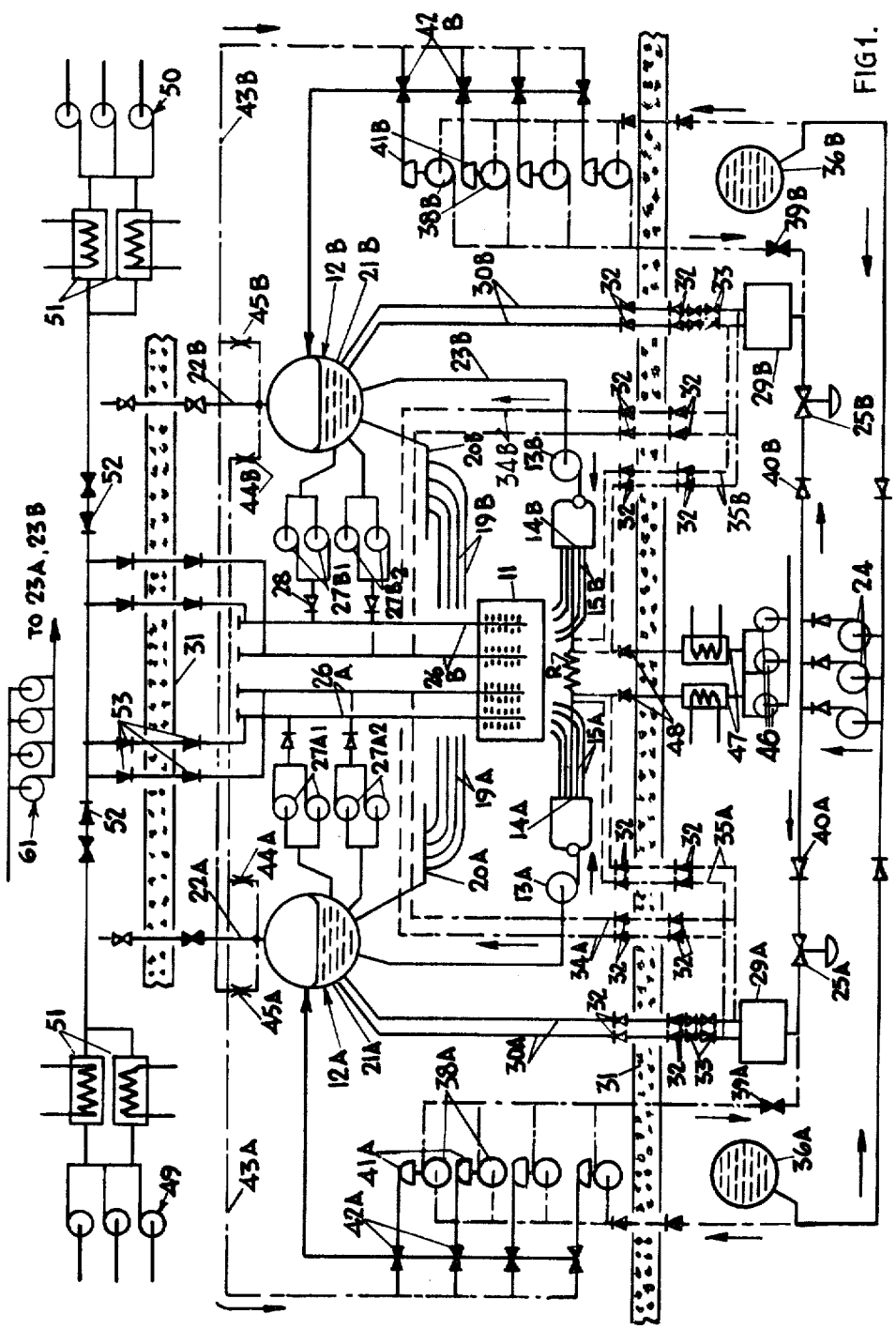
FIG. 1 is a schematic diagram of a first embodiment of the invention.

As shown schematically in FIG. 1, a nuclear reactor installation comprises a reactor core 11 which is of known kind and will not be described or illustrated in detail; briefly, the core comprises a calandria which contains heavy water serving as the reactor moderator and which is formed with a large number of vertical calandria tubes, surrounded by the heavy water and open at their upper and lower ends, through which extend pressure tubes in which fuel element assemblies are disposed and through which coolant water is caused to flow as described below.

Heat generated in the core is removed by two similar coolant-water circuits 12A and 12B. The circuit 12A comprises a plurality of circulator pumps 13A which, in parallel, supply coolant water to a bottom header assembly 14A which supplies a plurality of individual water feed pipes 15A. Each feed pipe 15A is connected to the lower end of a respective one of the above-mentioned pressure tubes (not shown in the drawings), the upper end of which is connected by a respective riser pipe 19A to one of a plurality of top header pipes 20A which open into a steam drum 21A. The steam drum 21A has a steam outlet 22A and downcomers 23A to the inlets of the circulator pumps 13A. Heat absorbed from the core 11 converts part of the circulated water into steam which, in the steam drum 21A, separates from the remaining water and leaves through the steam outlet 22A. The remaining water is recirculated, and a substantially constant water level within the steam drum 21A is maintained by main feedwater pumps 24 which supply water to the steam drum 21A under the control of a regulator valve 25A which, in turn, is controlled by means (not shown) which senses the water level in the steam drum 21A. The circuit 12B comprises similar components, and these, so far as shown in FIG. 1, are indicated there by the same reference numerals but with the affix B instead of A. The pumps 24 supply both circuits, under the control of the regulator valves 25A and 25B respectively.

The bottom header assemblies 14A and 14B of the two circuits 12A and 12B are connected to one another by pipes which, in FIG. 1, are schematically represented as a resistance R and through which, in the event of a failure in delivery of coolant water from the circulator pumps of one circuit, water flows from the other circuit to maintain at least a reduced flow of water in the pressure tubes in the circuit in which the failure has occurred. The two circuits 12A and 12B, and their bottom header assemblies 14A and 14B and the interconnection therebetween, may be substantially the same as one of the two pairs of linked circuits described, in greater detail, in our above-mentioned co-pending Application.

As in the said co-pending Application, a second route for the entry of coolant water into the pressure tubes, as spray cooling in the immediate vicinity of the nuclear fuel therein, is also provided; and the means for this may again be as described and shown in the co-pending Application, namely through a hollow central support tube of each of the above-mentioned fuel element assemblies (not shown). These fuel element assembly support tubes (referenced 26A and 26B in the accompanying drawings) receive, at their upper ends, water supplied, respectively, by core-spray pumps 27A1 and 27A2 from the steam drum 21A and by core-spray pumps 27B1 and 27B2 from the steam drum 21B. These core-spray pumps operate continuously during normal operation of the reactor, and the water they supply issues, through spray nozzles or apertures (not shown) distributed along the lengths of the tubes 26A and 26B in the immediate vicinity of the fuel of the assemblies, to mix with the water flowing upwardly through the pressure tubes from the bottom header assemblies 14A and 14B. The proportion of coolant water fed to the core by the core-spray pumps during normal operation of the reactor may be some 5% of the total coolant water circulation, the remaining 95% of the circulation being by means of the circulator pumps 13A and 13B.

The core-spray pumps 27A1 and 27A2 each serve half the pressure tubes normally supplied by the circulator pumps 13A; and similarly the core-spray pumps 27B1 and 27B2 each serve half the pressure tubes normally supplied by the circulator pumps 13B. Thus the two circuits 12A and 12B are kept segregated apart from their interconnection R between the two bottom header assemblies 14A and 14B, so as to minimise the risk of a failure in one circuit leading to a consequential failure in the other. The pumps (or, preferably and as shown, sets of pumps) 27A1, 27A2, 27B1 and 27B2 each feed (through a respective non-return valve 28) a respective core-spray manifold (not shown) to one of which each individual fuel element assembly support tube 26A or 26B is connected. The provision of more than a single pump to supply each core-spray manifold means that a single pump failure will not result in a complete failure of the core-spray water supply to any of the pressure tubes; the segregation of the pressure tubes into four groups, each receiving their core-spray water from a different respective core-spray manifold, is provided to ensure (as described below) adequate core-flooding performance as a safety measure in the event of a failure of any of the core-spray manifolds. The non-return valves 28 are to prevent, in the event of a serious breach of one (or both) of the coolant circuits 12A and 12B, loss of the core-spray feedwater which, in such an event, would be supplied to the core via another route, as described below.

The above-described continuously operating core-spray provision is effective to provide alternative cooling in the event of stagnation occurring in any of the pressure tubes in the event of a small breach in either of the coolant circuits 12A and 12B, such as a breach in one or several of the pressure tubes or their feedpipes 15A, 15B or riser pipes 19A, 19B or in the bottom header assemblies 14A, 14B or top header pipes 20A, 20B. However, the occurrence of a large breach in one of the circulator pumps 13A, 13B or of the downcomers 23A, 23B, could result in one of the steam drums being completely emptied of water and in the water level in the other falling to such an extent as to impair the core-spray water supply derived from it; and to take account of this possibility, an emergency method of maintaining the supply of coolant water to the core-spray manifolds (and also to the bottom header assemblies) is provided, as will now be described.

During normal operation of the reactor, the feed water supplied by the pumps 24 is fed, under control of the regulator valves 25A and 25B, to the drums 21A and 21B through respective feedwater heaters 29A and 29B and thence through feedwater pipes 30A, 30B to the respective steam drums. Each of these feedwater pipes, where it passes through a boundary wall 31 of an enclosure which contains the reactor and the coolant circuits, is provided inside and outside the wall 31 with non-return valves 32 to maintain the security of the enclosure; and each of these feedwater pipes further includes, between the feedwater heater 29A or 29B and the non-return valves 32, one or more normally open trip valves 33 which are controlled to close automatically on the occurrence of a breach in either coolant circuit. Preferably each of the feedwater pipes includes a plurality of the trip valves 33 in series, so that a failure of one of these valves to close on command will have no adverse effect. Preferably, there are two feedwater pipes 30A or 30B per steam drum, in order to reduce the size of the pipes and thereby reduce the maximum size of breach which can occur in them. Each feedwater pipe, upstream of its trip valves 33 (i.e. between the valves 33 and the respective feedwater heater 29A or 29B) has a branch 34A or 34B and a branch 35A or 35B each of which passes through the wall 31 and is fitted with non-return valves 32 inside and outside the wall. The two branches 34A (assuming there are two feedwater pipes 30A) are connected each to a respective one of the two core-spray manifolds which are normally supplied with water by the pumps 27A1 and 27A2 respectively; and the branches 35A are connected to the bottom header assembly 14A. Similarly, branches 34B and 35B are respectively connected to the core-spray manifolds normally supplied by the pumps 27B1 and 27B2 and to the bottom header assembly 14B. Preferably it is arranged that, during normal operation, the pressures produced in the core-spray manifolds by the core-spray pumps (such as pumps 27A1) and in the bottom header assemblies by the circulator pumps 13A and 13B, are sufficiently high to prevent flow through the branches 34A and B, and 35A and B in the direction permitted by their non-return valves 32; but the occurrence of a large breach in either coolant circuit 12A or 12B, and, simultaneously, the consequent closing of the corresponding trip valves 33, rapidly results in a fall in coolant flow and pressure due to the said pumps in that coolant circuit and thus in a compensating flow of diverted feedwater (which can no longer flow to the appropriate steam drum) direct to the core-spray manifolds through the branches 34A or 34B and to the bottom header assembly through the branch 35A or 35B. It may be arranged that some 40% of the feedwater supply rate is diverted in this way to the core-spray manifolds and that the remainder is available to the bottom header assemblies. A significant feature of the feedwater diversion arrangement just described is that, in the event of a large breach occurring (which could result in rapid emptying of one of the steam drums) the feedwater (which, after loss of the heat supply to the feed heaters 29A and 29B would be cold) is prevented from reaching the steam drums and thus from subjecting them to thermal stress.

By the means described, it can be ensured that any coolant-supply failure to the core-spray manifolds or to the bottom header assemblies, consequent on a circuit breach which trips the valves 33 of either coolant circuit, is immediately compensated by diversion of the feedwater as described, so long as the main feedwater pumps 24 continue to operate and to draw the feedwater from two surge tanks 36A and 36B which are preferably sited on opposite sides of the installation so that the likelihood of damage to both simultaneously is minimised. There is, however, a possibility that a loss-of-coolant accident due to a coolant-circuit breach as contemplated above will not only trip the valves 33 but will also initiate a full electrical shut-down of the installation with the result that power to the main feedwater pumps 24 will be lost. An alternative feedwater supply to cater for this eventuality is provided in the form of a further emergency coolant supply system which comprises two sets of pumps 38A and 38B, the pumps of ech set being connected in parallel to pump water from the surge tank 36A or 36B respectively through a controlled valve 39A or 39B to the feed heater 29A or 29B respectively. Non-return valves 40A and 40B prevent the water fed by the pumps 38A and 38B from flowing to the disabled main feed pumps 24. The pumps 38A and 38B are driven each by a respective steam turbine 41A or 41B, each having a respective steam inlet valve 42A or 42B. A steam line 43A supplies steam to all the inlet valves 42A, from both steam drums 21A and 21B (each of which is connected to this steam line through a respective diode resistance 44A or 44B, which may be a Venturi valve). Similarly both steam drums are connected through a respective diode resistance 45A or 45B to a steam line 43B which supplies steam to the steam inlet valves 42B. The steam inlet valves 42A and 42B are normally closed, but controlled to open automatically on the occurrence of a loss-of-coolant accident. When this occurs, the turbines 41A and 41B come into operation in a matter of seconds, driven by steam from both steam drums 21A and 21B or (if the loss-of-coolant accident stems from a large breach in one of the coolant circuits, so that pressure has been lost in one of the steam drums) from the steam drum at higher pressure. In this latter case, the diodes 44A and 45A, or 44B and 45B, as the case may be, prevent the depressurisation which occurs in one steam drum from leading to a serious depressurisation in the other drum.

If the loss-of-coolant accident also results in an electrical shut-down, so that power to the main feedwater pumps 24 is also lost and coolant flow in the diversion branches 34A, 34B, 35A, 35B is lacking, a signal to that effect causes the controlled valves 39A, 39B to open, so that the above-described rapid initiation of the turbines 41A and 41B and of the pumps 38A and 38B provides an immediate alternative supply of feedwater from the surge tanks 36A and 36B, this alternative supply being powered by the energy stored in the coolant circuits (or in one of them if the other has been breached) and by the energy which continues to be extracted by the coolant from the fuel in the period immediately following shutdown. The supply of feedwater by the turbine-driven pumps 38A and 38B is not under the control of the regulating valves 25A and 25B, and may result in the steam drums 21A and 21B (or whichever of them is in an unbreached coolant circuit) becoming overfilled with water. The drums 21A and 21B are therefore provided with sensors (not shown) to detect some predetermined high water level in the drums and means (not shown) are provided to close the steam inlet valves 42A and 42B on the occurrence of such a high water level in either steam drum. It is arranged, however, that the time required for this condition to be reached is greater than the time required to bring into operation the standby diesel-powered electrical supply and thus to reinstate the continuous-spray pumps 27A1 etc, which would have ceased to operate on the occurrence of the main electrical shut-down. Thus the pumps 38A and 38B maintain the supply of feedwater during the whole of the interval from shutdown of the main feedwater pumps 24 (due to shut-down of the main electrical supply) to the coming into operation of the diesel-driven standby electrical supply. During this interval, if the main electrical shut-down has occurred as a consequence of a breach in one of the coolant circuits, the valves 33 will be closed and the water supplied by the pumps 38A and 38B will be fed into the coolant circuits via the branch lines 34A, 34B, 35A and 35B.

For long-term residual cooling once the coolant circuits have depressurised sufficiently after a reactor shutdown, there are provided separate low-pressure water feed systems, as follows. Pumps 46 draw water from a pond or sump (not shown) of the reactor and feed it through coolers 47 and non-return valves 48 to the bottom header assemblies 14A and 14B, conveniently via the main feedwater diversion branches 35A and 35B. The non-return valves 48 isolate the coolant circuits (so long as these are pressurised) from this low pressure system. Further pump sets 49 and 50 also draw water from the pond or sump and feed it through coolers 51 and non-return valves 52 to the core-spray manifolds, whereby a low-pressure core-spray is provided after depressurisation of the coolant circuits. Non-return valves 53, where this further low-pressure system penetrates the wall 31, serve both to preserve the integrity of this boundary and to isolate the core-spray manifolds from one another. The low-pressure core-spray system may, advantageously, be the same system which, during normal operation of the reactor, provides residual heat removal during refuelling of the reactor. For this purpose, the inlets of the pumps 49 and 50 can be connected to take water from, say, the bottom header assemblies 14A and 14B (instead of from the pond or sump as described above) so as to provide a downward circulating coolant flow through the pressure tubes during refuelling. The heat thus abstracted is then removed by means of the coolers 51 as the coolant circulates.

The installation shown in FIG. 2 is, except as referred to below, the same as that shown in FIG. 1; and corresponding parts are indicated by the same reference numerals in the two Figures. In particular, the coolant circuits 12A and 12B are the same in the two cases, but, for clarity of the remaining parts, the circulator pumps 13A and B, the feedpipes 15A and B, the riser pipes 19A and B, and the top header pipes 20A and B which are shown in FIG. 1 are omitted from FIG. 2. In the installation shown in FIG. 2, only a single surge tank 36 is provided, and the pumps 38A and 38B, which are brought into operation by a loss-of-coolant accident and which become effective in the event of an electrical shut-down disabling the main feedwater pumps 24, draw their water not from this surge tank but from the reactor pond (indicated in FIG. 2 by the reference numeral 55) which is located inside the containment wall 31. The water pumped by the pumps 38A and 38B does not pass outside the wall 31 to the feedwater heaters 29A and 29B but instead is fed, within the containment, through respective valves 56 (corresponding to the valves 39A and B in FIG. 1) to stored-energy vessels 57 each of which is connected to a respective one of the branch pipes 34A, 34B, 35A and 35B within the containment. These vessels 57, being connected by their respective branch pipes to the main coolant circuits or core-spray circuits as the case may be, contain water at a temperature (say 200° C) corresponding to that prevailing in these circuits during normal reactor operation; and initiation of the pumps 38A and 38B to feed water from the pond (at a temperature of perhaps only 20° C) results in an initially hot, but then progressively cooler, flow of water from the vessels 57 into the various branch pipes and thence into the coolant circuits. Thus the stored thermal energy in the vessels 57 serves to prevent or lessen the occurrence of thermal shock in the coolant circuits when the pumps 38A and 38B become effective. The valves 56 serve, inter alia, to maintain the isolation of the core-spray feed pipework from the bottom header assemblies in the main coolant circuits.

The installation shown in FIG. 3 is again similar to that shown in FIGS. 1 and 2, and corresponding parts are indicated by the same reference numerals. In the installation shown in FIG. 3, the regulator valves 25A and 25B are disposed downstream of the branch points of the branch pipes 34A, 34B, 35A and 35B, and flow into the branch pipes is therefore not regulated in dependence on the water level in the steam drums 21A and 21B. This arrangement permits increased values of resistance $r$ to be inserted in the branch lines to guard more effectively against starvation of these lines in the event of one of them developing a breach or being connected to a breached part of the coolant circuits. Feedwater flow into the branch pipes may, as described with reference to FIG. 1, be controlled simply in dependence on the pressures prevailing in the circuits 12A and 12B, or may, as illustrated, be positively controlled by normally closed trip valves 59 which are opened when the valves 33 are closed.

The main difference in the installation shown in FIG. 3 is that the pumps 38A and 38B which, when operative, pump water from the pond 55 into the branch pipes 34A, 34B 35A and 35B, are divided into separate sets. Thus the branch pipes 34A and 35A are fed, respectively, from pumps 38A1 and 38A2, driven respectively by steam turbines 41A1 and 41A2 whose steam supply is controlled by steam valves 31A1 and 42A2 respectively; and similarly with the branch pipes 34B and 35B, for which pumps 38B1 and 38B2, steam turbines 41B1 and 41B2, and steam inlet valves 42B1 and 42B2 are provided. Although all these pumps are shown as feeding directly into the respective branch pipes, it will be understood that stored-energy vessels corresponding to the stored-energy vessels 57 shown in FIG. 2 may be interposed.

FIG. 3 also shows, explicitly, a sump 60 of the reactor, in which water escaping from a coolant-circuit breach will collect, as well as the inlet connections to the low-pressure pumps 46, 49 and 50, showing that these can be connected to draw water either from the pond 55 or from the sump 60 or, in the case of the pumps 49 and 50, from the bottom header assemblies 14A and 14B to establish through the core-spray system a low-pressure coolant circulation to provide cooling during off-load refuelling (as described with reference to FIG. 1). FIG. 3 further shows, on the outlet sides of the pumps 49 and 50, trip valves 61 which are normally closed but which, under the control of pressure sensors (not shown), open when the pressure in the core spray inlet headers falls below some predetermined value at which the low-pressure core-spray system is to come into operation.

As described above, the arrangements according to the invention provide for adequate supplies of coolant water both to the bottom header assemblies and to the core-spray manifolds, in the event of a loss-of-coolant accident. Mention has already been made of the pumps 38A and B being brought into operation, in the event of a loss-of-coolant accident, so that they become effective (if an electrical shut-down occurs as well) to replce the main feed pumps 24 which would fail in that event. To cater for the more frequent occurrence, of electrical shut-down not accompanied by a loss-of-coolant accident, a guaranteed feedwater supply system 62 is provided, in the usual manner, with pumps which are powered by the conventional diesel-backed guaranteed electrical supply which is also provided in conventional manner. The guaranteed feedwater system 62 is essentially of only small capacity, being intended only to make up evaporative losses when the coolant circuits remain intact, and is therefore not suitable to cope with loss-of-coolant accidents. It is made as reliable as possible, and is brought into action preferentially, in the event of an electrical shut-down, because it draws water from a clean (demineralised) supply which is superior to the water available (particularly referring to FIG. 2) from the reactor pond. Since the steam-turbine driven pumps 38A and B are present, however, it is arranged that they and their driving turbines shall be brought into action not only by a breach-induced loss-of-coolant accident but equally by an abnormally low water-level in either steam drum. Thus if the guaranteed feed system should fail to make up evaporative losses after an electrical shut-down, the pumps 38A and B will operate as a second line of protection in this respect even if no breach-induced loss-of-coolant accident has occurred.

I claim:

1. In a water-cooled nuclear reactor comprising: two coolant circuits each comprising a bottom header, a plurality of vertically-arranged pressure tubes each having nuclear fuel disposed therein and being connected at its lower end to the bottom header to receive therefrom a main flow of coolant water for cooling the fuel, a steam drum connected to the upper ends of the pressure tubes to receive heated coolant water therefrom, main coolant-circulator means arranged for pumping water from the steam drum to the bottom header, and respective further pump means arranged to pump an auxiliary coolant water flow from the steam drum of each coolant circuit directly into the pressure tubes of that circuit in the form of spray cooling in such pressure tubes; means interconnecting the bottom headers of the two coolant circuits; a steam outlet for each steam drum; a water inlet means for each steam drum; main feedwater pumps arranged to supply make-up water to the said water inlet means; and water inlet valves connected between the main feedwater pumps and the said water inlet means, that improvement comprising: means controlling the water inlet valves in dependence on the pressure in the coolant circuits and closing said valves in response to a fall in such pressure; and further connections arranged to supply feedwater directly, in the event of such pressure fall, from the main feedwater pumps to the bottom header of each coolant circuit and into the pressure tubes of each coolant circuit as the said spray cooling therein.

2. In a nuclear reactor as claimed in claim 1, wherein the main feedwater pumps are electrically driven pumps, that improvement comprising emergency feedwater pumps and steam turbines connected to drive the same, said steam turbines being connected to receive steam from the steam drums of both coolant circuits through valves which isolate the steam drums from one another and through normally-closed valves which are arranged to open in response to a pressure fall in either steam drum.

3. A combination as claimed in claim 2, wherein the main feedwater pumps and the emergency feedwater pumps are arranged to draw water from a common source.

4. A combination as claimed in claim 2, wherein the main feedwater pumps and the emergency feedwater pumps alike are connected to pump their outputs through a feedwater heater disposed upstream of the said water inlet valves.

5. A combination as claimed in claim 2, provided with stored-energy vessels connected respectively to the bottom headers and to the spray-cooling coolant flow and containing normally-stagnant hot water in temperature equilibrium with the water supplied by the bottom headers and with the spray-cooling water, wherein the emergency feedwater pumps are arranged to pump, when operative, relatively cold water into the stored-energy vessels and thereby to provide alternative supplies of water of which the temperature decreases gradually.

6. A combination as claimed in claim 1, provided additionally with low-pressure feedwater pumps arranged to provide an alternative, low-pressure, spray-cooling water flow to the pressure tubes during the occurrence of low-pressure conditions in the said two coolant circuits.

7. A combination as claimed in claim 6, wherein the low-pressure feedwater pumps are connectable to draw water from the bottom headers of the said two coolant circuits, thereby to provide a circulating flow of low-pressure coolant water through the pressure tubes.

* * * * *